United States Patent
Kraft

(10) Patent No.: US 9,265,101 B2
(45) Date of Patent: Feb. 16, 2016

(54) LED DRIVE SYSTEM FOR CONTROLLING AN OFF-CHIP POWER SUPPLY

(71) Applicant: ANALOG DEVICES, INC., Norwood, MA (US)

(72) Inventor: Jonathan Kraft, Frederick, CO (US)

(73) Assignee: Analog Devices, Inc., Norwood, MA (US)

( * ) Notice: Subject to any disclaimer, the term of this patent is extended or adjusted under 35 U.S.C. 154(b) by 303 days.

(21) Appl. No.: 13/829,607

(22) Filed: Mar. 14, 2013

(65) Prior Publication Data

US 2014/0015426 A1    Jan. 16, 2014

Related U.S. Application Data

(60) Provisional application No. 61/670,458, filed on Jul. 11, 2012.

(51) Int. Cl.
*H05B 37/00* (2006.01)
*H05B 33/08* (2006.01)
*H05B 37/02* (2006.01)

(52) U.S. Cl.
CPC ........ *H05B 33/0809* (2013.01); *H05B 33/0815* (2013.01); *H05B 33/0827* (2013.01); *H05B 33/0836* (2013.01); *H05B 33/0884* (2013.01); *H05B 37/02* (2013.01); *Y02B 20/341* (2013.01); *Y02B 20/347* (2013.01)

(58) Field of Classification Search
None
See application file for complete search history.

(56) References Cited

U.S. PATENT DOCUMENTS

| | | | |
|---|---|---|---|
| 7,999,487 B2 * | 8/2011 | Szczeszynski | 315/291 |
| 2009/0302776 A1 * | 12/2009 | Szczeszynski | 315/246 |
| 2010/0148679 A1 * | 6/2010 | Chen et al. | 315/185 R |
| 2011/0043138 A1 * | 2/2011 | Hsu et al. | 315/297 |

* cited by examiner

*Primary Examiner* — Long Nguyen
(74) *Attorney, Agent, or Firm* — Schwegman Lundberg & Woessner, P.A.

(57) ABSTRACT

A LED drive system for controlling an off-chip power supply enables the power supply function to be located 'off-chip'—i.e., on an IC which is separate from the IC containing the other LED drive system components. The off-chip supply provides a common line voltage for LED strings connected in series with respective current sink circuits at respective junctions, in response to a signal applied to a control input. The system includes a 'minimum' circuit which outputs the least of the voltages at the junctions, and an I/O pin which receives a signal that varies with the output of the minimum circuit. When the external supply's control input is coupled to the system's I/O pin, the present system controls the output of the external power supply as needed to provide a desired common line voltage.

6 Claims, 3 Drawing Sheets

LED DRIVE SYSTEM FOR CONTROLLING AN OFF-CHIP POWER SUPPLY

RELATED APPLICATIONS

This application claims the benefit of provisional patent application No. 61/670,458 to Kraft et al., filed Jul. 11, 2012.

BACKGROUND OF THE INVENTION

1. Field of the Invention

This invention relates generally to series/parallel LED drive systems, and more particularly to methods of controlling the power supply which provides the line voltage for parallel-connected LED strings.

2. Description of the Related Art

LED lighting strategies may employ LEDs driven in series, parallel, or both. LEDs driven in series by definition all share the same current. If all LEDs share the same current, ideally the brightness of the LEDs will be matched. Some applications require a number of LEDs to be driven with matched brightness, and so connecting the LEDs in series accomplishes the task. A problem can arise, however, if a very large number of LEDs must be driven in series. The series-connected LEDs are powered by a line voltage necessary to provide the necessary current; however, finding line regulators able to support the large line voltage needed for a high LED count series string may be difficult or cost prohibitive.

LEDs may also be arranged in parallel-connected 'strings', each of which is driven by a current source or (most commonly) a current sink circuit. But brightness matching between the parallel-connected LEDs is limited by the imperfect matching of the drive circuits, which can vary widely depending on the choice of sink implementation. A parallel LED configuration does have the advantage of typically requiring a lower line voltage than does a series configuration, which may be a benefit in some applications. Also, in some applications LEDs are connected in parallel because different currents need to be driven through the LEDs.

Due to the issues noted above, the best approach may be a compromise between the series and parallel solutions: a "series/parallel" solution. A cost-effective compromise employing a series/parallel solution is shown in FIG. 1. Here, each series LED string 1, 2, 3 has its own independent current sink circuit 4, 5, 6, but all series strings share a common line voltage $V_{line}$, which is provided by a voltage regulator 7. The voltage on the current sink circuits (VD0, VD1, VD2) is generally set to be equal to the maximum voltage that a string of LEDs might have on its anode connection. This can be arranged by means of a "minimum" circuit 8, which receives the voltages on each of the current sinks and outputs the minimum voltage of the group. An error amplifier 9 receives the minimum voltage and a reference voltage $VD_{desired}$ at respective inputs, and provides an output $V_{err}$ to the feedback input of voltage regulator 7 such that the current sink circuit with the minimum VD voltage operates at a desired target voltage equal to $VD_{desired}$.

Conventionally, the components (such as voltage regulator 7) which generate common line voltage $V_{line}$ are integrated with the other elements of the LED drive system to form a complete LED controller IC. However, including this power supply functionality within the LED controller IC may be costly and require an unacceptably large amount of die area.

SUMMARY OF THE INVENTION

A LED drive system for controlling an off-chip power supply is presented which addresses the problems discussed above.

The present system enables the power supply function to be located 'off-chip'—i.e., on an IC which is separate from the IC containing the other LED drive system components. The off-chip power supply provides a common line voltage for two or more LED strings that are connected in series with respective current sink circuits at respective junctions, with each of the current sink circuits arranged to cause a desired current to be conducted by the LED string to which it is connected. The system requires:

a 'minimum' circuit which receives the voltages at each of the junctions at respective inputs and which outputs a 'minimum' voltage which is proportional to the least of the received voltages; and an I/O pin which receives a signal that varies with the output of the minimum circuit. An external ('off-chip') power supply which produces an output voltage that varies with a signal applied to a control input can then be used to provide the line control voltage. The supply's control input is coupled to the system's I/O pin, with the present system arranged to control the output of the external power supply as needed to provide a desired common line voltage.

The system may further include an error amplifier which receives the 'minimum' voltage and a reference 'desired junction voltage' at respective inputs and outputs a voltage that varies with the difference between the inputs. Then, the signal which varies with the output of the minimum circuit provided to the I/O pin can be the output of the error amplifier. Such an arrangement might further include a variable current source connected to the I/O pin with is arranged to conduct a current via the I/O pin that varies with the output of the error amplifier. The system might also provide a compensation node to which the output of the error amplifier and the control input for the variable current source are connected.

The present system enables various types of off-chip power supplies to be used to provide the common line voltage, including, for example, DC-DC converters or a PMOS transistor.

These and other features, aspects, and advantages of the present invention will become better understood with reference to the following description and claims.

DETAILED DESCRIPTION OF THE INVENTION

Figure 1:
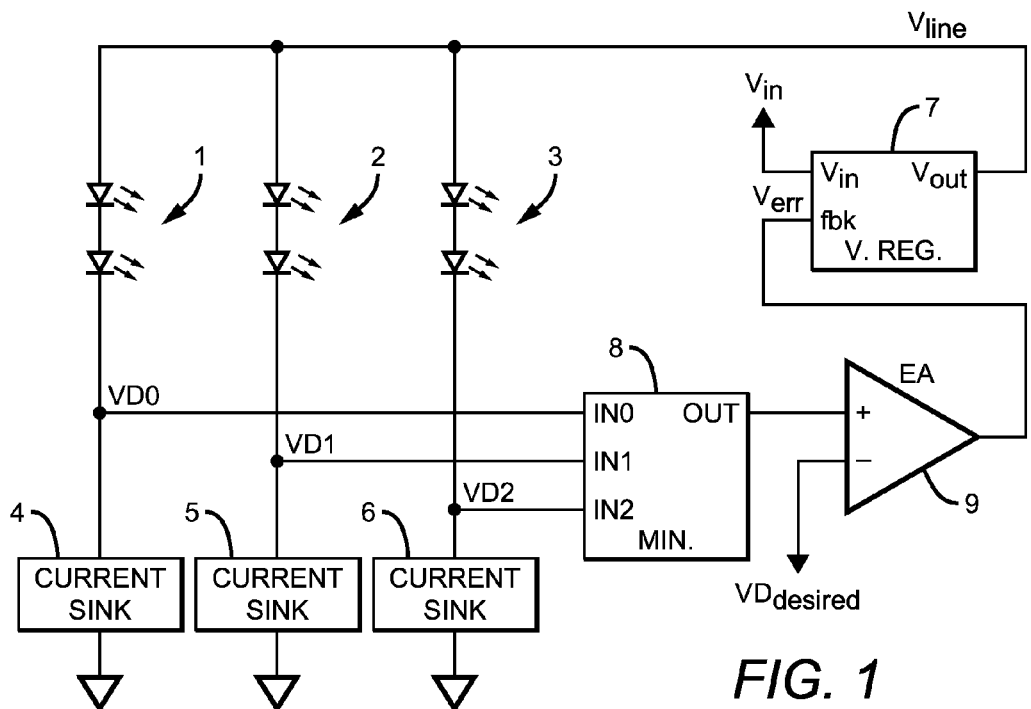
FIG. 1 is a block/schematic diagram of a known LED drive system.
Figure 2:
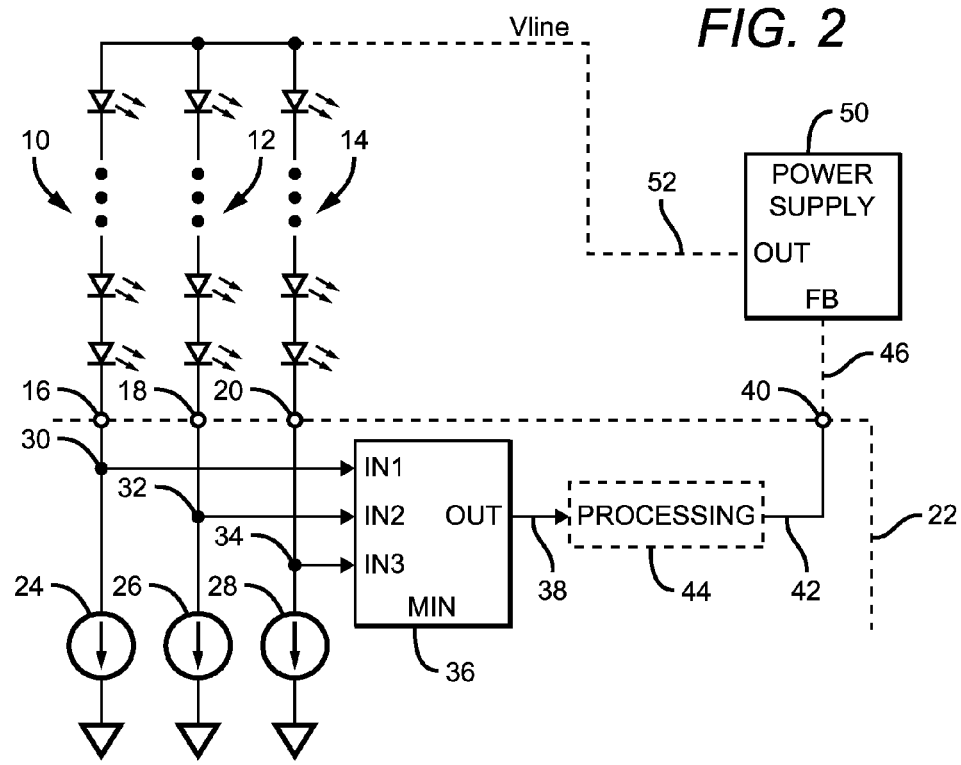
FIG. 2 is a block/schematic diagram of a LED drive system for controlling an off-chip power supply per the present invention.

The present LED drive system is for controlling an off-chip power supply that supplies a common line voltage for two or more LED strings that are connected in series with respective current sink circuits at respective junctions, with each of the current sink circuits arranged to cause a desired current to be conducted by the LED string to which it is connected. The basic principles of the present system are illustrated in FIG. 2. Two or more LED strings 10, 12, 14, each typically consisting of multiple LEDs connected in series, are connected to respective I/O pins 16, 18, 20 on an LED drive system IC 22. Each of the LED strings is connected to a respective current sink circuit 24, 26, 28 on IC 22 at respective junctions 30, 32, 34, and all the strings are powered by a common line voltage $V_{line}$. Each current sink circuit is arranged to cause a desired current to be conducted by the LED string to which it is connected.

The system includes a 'minimum' circuit 36 on IC 22, which receives the voltages at each of junctions 30, 32, 34 at respective inputs and outputs a 'minimum' voltage 38 which is proportional to—and preferably equal to—the least of the received voltages. IC 22 also includes an I/O pin 40 which receives a signal 42 that varies with the output of minimum circuit 36; as discussed in more detail below, the output 38 of minimum circuit 36 may undergo one or more forms of processing (44) before being delivered to I/O pin 40.

The LED drive system on IC 22 is arranged such that, when I/O pin 40 is coupled (via a conductor 46) to the control input (FB) of an external 'off-chip' power supply 50 which produces an output voltage 52 that varies with a signal applied to the control input, the LED drive system controls the power supply's output voltage. The output 52 of external power supply 50 provides common line voltage $V_{line}$. Thus, minimum circuit 36, external power supply 50, and LED strings 10, 12, 14 form a control loop. In typical operation, the LED drive system on IC 22 varies the signal at I/O pin 40 as needed to cause external power supply 50 to provide the common line voltage $V_{line}$ necessary to maintain minimum voltage 38 at a level necessary to ensure that a minimum amount of voltage headroom is provided for all of current sinks 24, 26, 28.

When so arranged, with the LED drive system controlling an external power supply which resides off-chip, readily-available off-the-shelf power supply devices may be used to provide $V_{line}$. As such, this functionality can be omitted from IC 22, reducing the cost, circuit complexity and required die area of the LED drive system IC.

Figure 3:
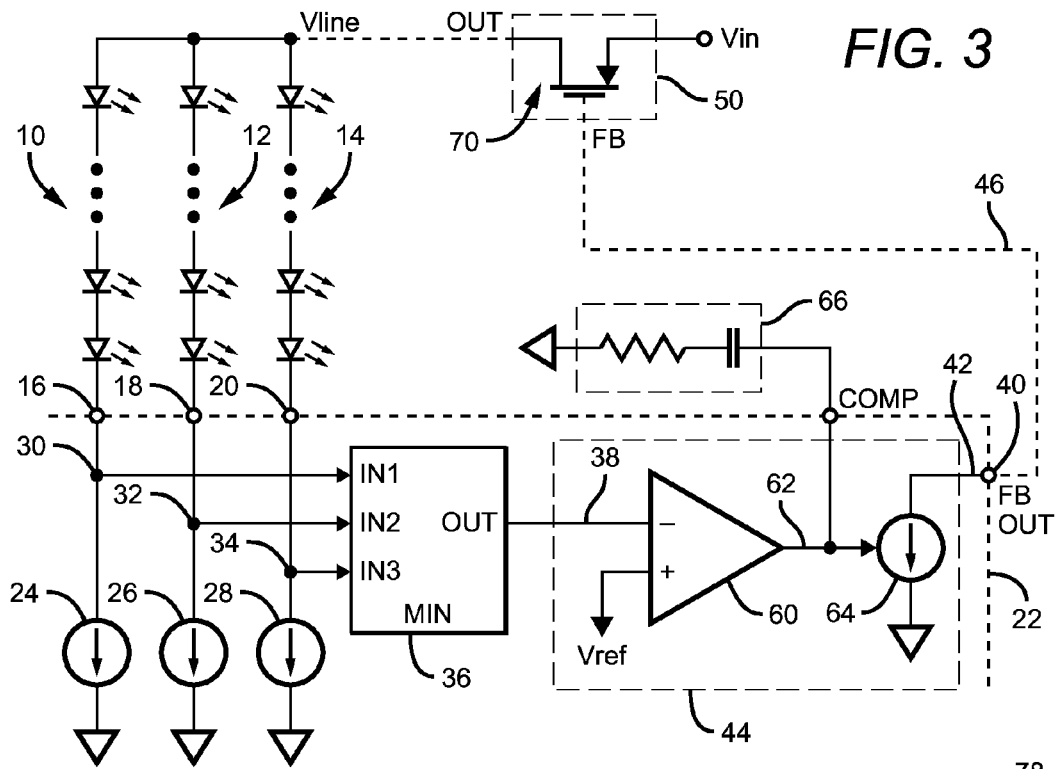
FIG. 3 is a block/schematic diagram of another possible embodiment of a LED drive system for controlling an off-chip power supply per the present invention.

As shown in FIG. 3, I/O pin 40 is suitably designated as a 'feedback' I/O pin (FB OUT), with the present LED drive system further comprising an error amplifier 60 which receives 'minimum' voltage 38 and a reference 'desired junction voltage' Vref at respective inputs and which outputs a voltage 62 that varies with the difference between its inputs. Here, the signal 42 which varies with the output of minimum circuit 36 and is provided to I/O pin FB OUT is the output 62 of error amplifier 60.

Though output 62 of error amplifier 60 might be directly connected to I/O pin FB OUT or be otherwise processed, it is preferred that output 62 be connected to a variable current source 64, which is connected to FB OUT and arranged to conduct a current via FB OUT that varies with the output of the error amplifier. In this way, a signal is provided at FB OUT which is suitable for controlling a number of different types of external power supplies.

The LED drive system on IC 22 might also include a compensation node COMP, to which compensation components 66 might be connected. The output 62 of error amplifier 60 (and the control input of variable current source 64) can then be connected to compensation node 66, with components 66 providing stability to the control loop formed by the external power supply, LED strings, minimum circuit and error amplifier.

The present system provides a means of controlling a variety of power stage types that can be used to generate $V_{line}$. One possible external power supply 50 is simply an off-chip transistor; an exemplary embodiment is shown in FIG. 3. Here, the current circuit of the transistor 70 is connected between an input voltage Vin and an output node OUT, with the control input of the transistor coupled to I/O pin FB OUT. The voltage at output node OUT is common line voltage $V_{line}$. In this example, transistor 70 is a PMOS FET, with its drain-source circuit connected between OUT and Vin, and its gate input coupled to I/O pin FB OUT; other transistor types could also be used.

In operation, a control loop is formed by transistor 70, LED strings 10, 12, 14, minimum circuit 36, error amplifier 60 and variable current source 64. The LED drive system on IC 22 varies the signal 46 at I/O pin FB OUT as needed to cause transistor 70 to produce a common line voltage $V_{line}$ which makes the 'minimum' voltage 38 equal to desired junction voltage Vref. When there is a large error between 'minimum' voltage 38 and Vref, current source 64 is driven to conduct more current. This decreases the gate voltage of PMOS FET 70, which decreases its resistance and causes the voltage at output node OUT—and thus $V_{line}$—to increase as needed to drive 'minimum' voltage 38 towards Vref.

Figure 4:
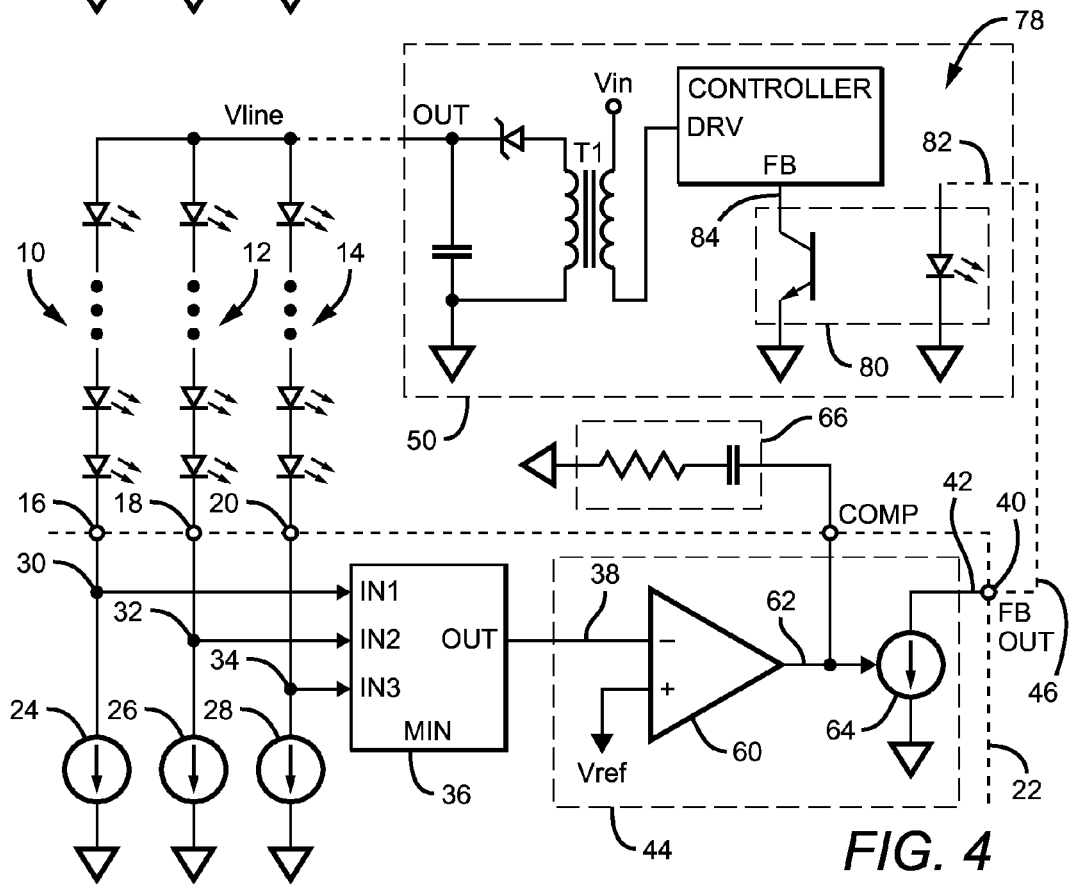
FIG. 4 is a block/schematic diagram of another possible embodiment of a LED drive system for controlling an off-chip power supply per the present invention.

Another possible external power supply 50 could be an off-chip DC-DC converter 78; one possible embodiment is shown in FIG. 4. Here, the DC-DC converter has a transformer T1 with a primary side and a secondary side, with the secondary side coupled to an output node OUT. The DC-DC converter may also include an optocoupler 80 (which may be a part of the converter or a separate off-chip component) having an input 82 which is coupled to feedback I/O pin FB OUT and an output 84 which is connected to the control input FB of the DC-DC converter's controller 86. The controller drives the primary side of transformer T1 to produce an output voltage at output node OUT; this voltage is employed as $V_{line}$.

As before, in typical operation, the LED drive system on IC 22 varies the signal 46 at I/O pin FB OUT as needed to cause power supply 50 to produce a common line voltage $V_{line}$ which makes the 'minimum' voltage 38 equal to desired junction voltage Vref. When there is a large error between 'minimum' voltage 38 and Vref, current source 64 is driven to conduct more current. As the FB OUT current increases, the voltage on optocoupler 80 decreases, which causes the controller to increase the current conducted by the primary side of transformer T1, resulting in the voltage at output node OUT—and thus $V_{line}$—increasing as needed to drive 'minimum' voltage 38 towards Vref.

Figure 5:
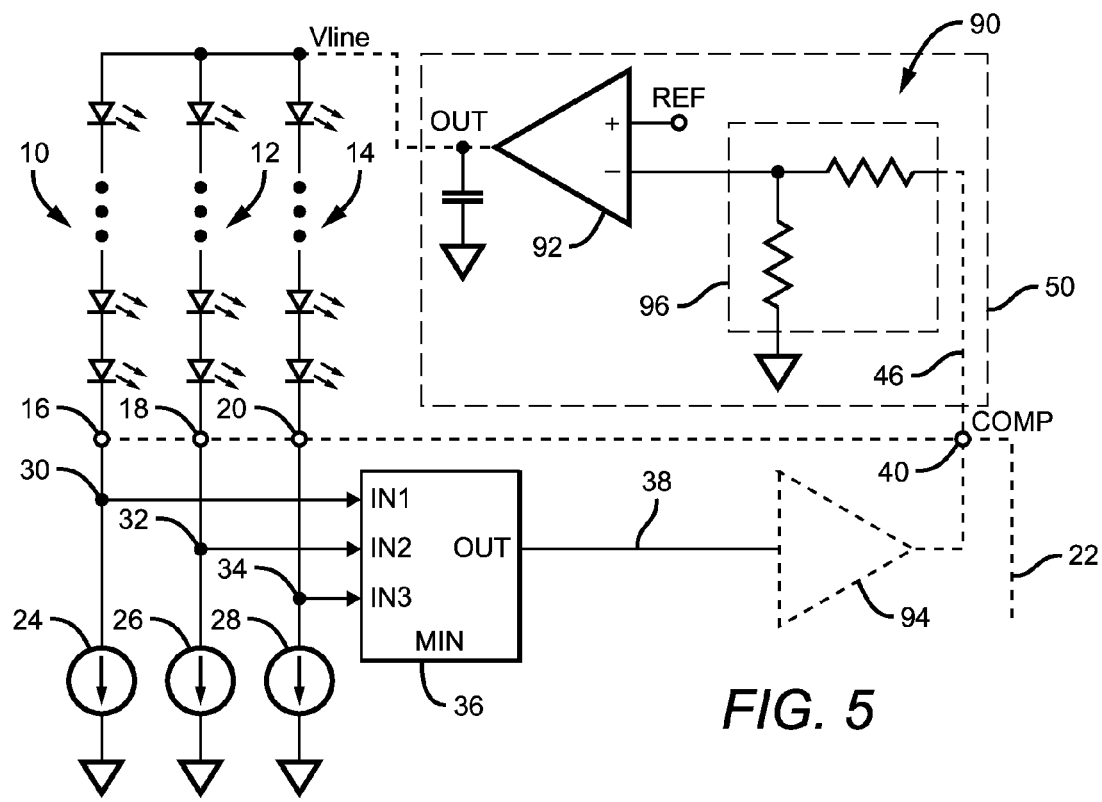
FIG. 5 is a block/schematic diagram of another possible embodiment of a LED drive system for controlling an off-chip power supply per the present invention.

Another possible embodiment is shown in FIG. 5. In this example, external power supply 50 is an off-chip DC-DC converter 90 which has its own error amplifier 92. Since converter 90 has its own error amplifier, it is not necessary to produce an error amplifier output from within the LED drive system on IC 22. Instead, the output 38 of minimum circuit 36 is provided to I/O pin 40; if necessary, output 38 can be scaled with a scaling circuit 94 prior to its being provided to I/O pin 40. Error amplifier 92 receives a reference voltage REF at one input and is coupled to I/O pin 40 at its other input; the signal at I/O pin 40 can be divided down with a divider 96 if needed to match REF. Error amplifier 92 thus produces an output OUT which varies with the difference between 'minimum' voltage 38 and REF, with the voltage at output node OUT being common line voltage $V_{line}$. The LED drive system on IC 22 varies the signal 46 at I/O pin 40 as needed to produce a common line voltage $V_{line}$ which makes the 'minimum' voltage equal to the desired junction voltage. DC-DC converter 90 could be, for example, a boost converter, a buck converter, or a low dropout (LDO) voltage regulator.

Figure 6:
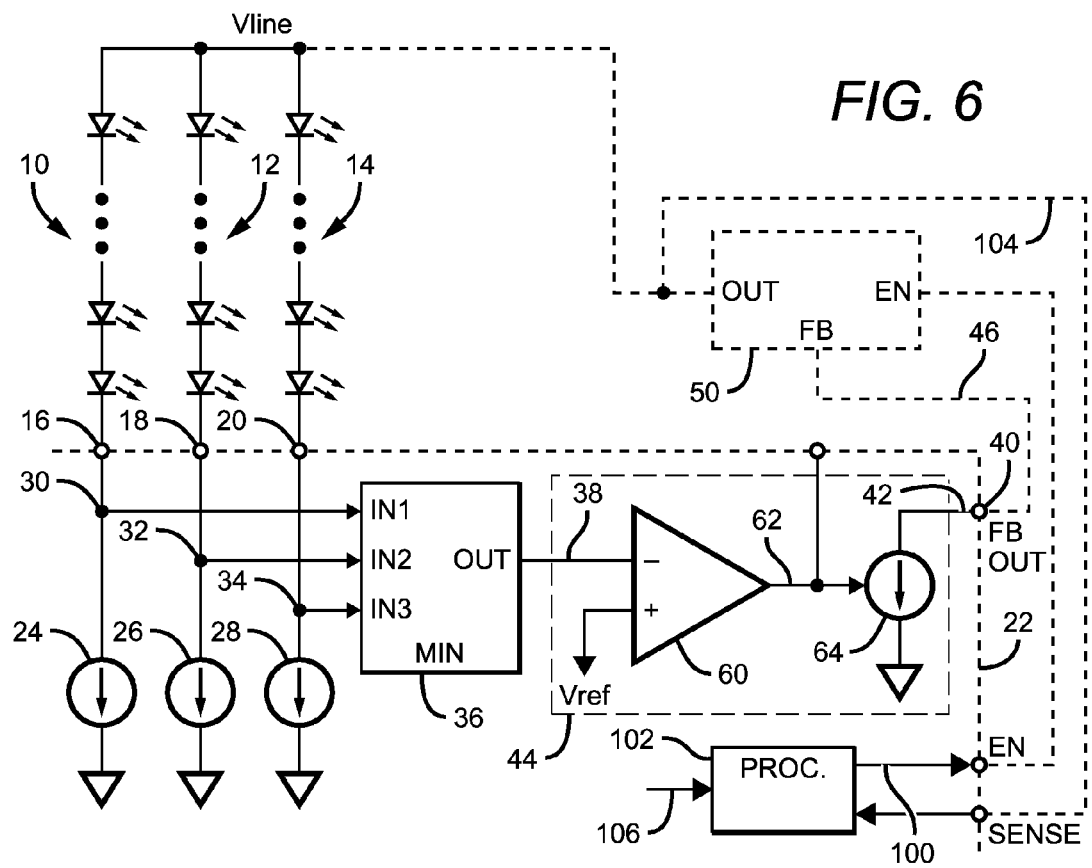
FIG. 6 is a block/schematic diagram of another possible embodiment of a LED drive system for controlling an off-chip power supply per the present invention.

As shown in the embodiment shown in FIG. 6, the present LED drive system may further comprise an 'enable' I/O pin EN on IC 22 which provides a signal 100 that indicates whether the external power supply should be active or shut down. Then, if external power supply 50 includes an enable input EN that is coupled to the I/O pin EN, and is arranged to produce a non-zero output voltage when the signal on the enable I/O pin indicates that external power supply 50 should be active and to shut down when the signal on the enable I/O pin indicates that the external power supply should be shut down, then the LED drive system of IC 22 controls the state of external power supply 50. The enable signal 100 is suitably produced by a processing module 102 on IC 22.

The present LED drive system may also include a 'voltage sense' I/O pin SENSE which receives a signal 104 from external power supply 50 that varies with its output voltage. A comparison circuit (not shown), suitably located within processing module 102, is arranged to compare signal 104 with a limit voltage, and to toggle an output when the comparison circuit indicates that the output voltage is greater than the limit voltage. The output that is toggled by the comparison circuit is suitably the EN signal 100 which operates to shut down external power supply 50. This mechanism might be used to shut down external power supply 50 in the event of an overvoltage condition that occurs due to some system fault. Additional inputs 106 might also be used to toggle EN signal 100 when there is a need to shut down external power supply 50.

The embodiments shown are merely exemplary, and are used only to illustrate how the present LED drive system can be used with a variety of power stage types, including stand-alone off-the-shelf boost and buck converters. It is only necessary that the external power supply be arranged to produce an output voltage that varies with a signal applied to its control input, such that connecting the control input to an I/O pin on the LED drive system IC as described herein enables the LED drive system IC to control the output voltage produced by external power supply 50.

One of the advantages of this approach is that any power stage can be used with the LED control stage. By separating the power stage from the LED drive system, each of the separate ICs can be optimized.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. An LED drive system which resides on a first integrated circuit (IC) and is arranged to control an external power supply that resides off chip from the IC and supplies a common line voltage for two or more LED strings that are connected in series with respective current sink circuits at respective junctions, each of said current sink circuits arranged to cause a desired current to be conducted by the LED string to which said current sink circuit is connected, said LED drive system comprising:
a minimum circuit which receives voltages at each of said junctions at respective inputs and which outputs a minimum voltage which is proportional to the least of the received voltages; and
an I/O pin on said first IC which receives a signal that varies with the output of said minimum circuit, wherein said I/O pin is a feedback I/O pin;
said LED drive system arranged such that, when said I/O pin is coupled to a control input of the external power supply which produces an output voltage that varies with a signal applied to said control input, said LED drive system controls said external power supply's output voltage, the output voltage of said external power supply provided as said common line voltage,
wherein said external power supply is an external transistor connected between an input voltage and an output node, with a control input of said external transistor coupled to said feedback I/O pin and the output voltage at said output node being said common line voltage, said LED drive system varies the signal at said feedback I/O pin as needed to produce the common line voltage which makes said minimum voltage equal to said desired junction voltage.

2. The LED drive system of claim 1, further comprising an error amplifier which receives said minimum voltage and a reference desired junction voltage at respective inputs and which outputs a voltage that varies with the difference between said inputs of said error amplifier, said signal which varies with the output of said minimum circuit provided to said feedback I/O pin being the output of said error amplifier.

3. The LED drive system of claim 2, further comprising a variable current source connected to said feedback I/O pin and arranged to conduct a current via said feedback I/O pin that varies with the output of said error amplifier.

4. The LED drive system of claim 2, further comprising a variable current source and a compensation node, said variable current source connected to said feedback I/O pin and arranged to conduct a current that varies with a signal applied to a control input, the output of said error amplifier and said control input connected to said compensation node.

5. The LED drive system of claim 4, further comprising one or compensation circuit components connected to said compensation node.

6. The LED drive system of claim 1, wherein said external transistor is a PMOS FET.

* * * * *